Aug. 2, 1966    A. G. HELLSTROM    3,263,440
REFRIGERATION
Filed Dec. 14, 1964    5 Sheets-Sheet 1

INVENTOR
BY
ATTORNEY

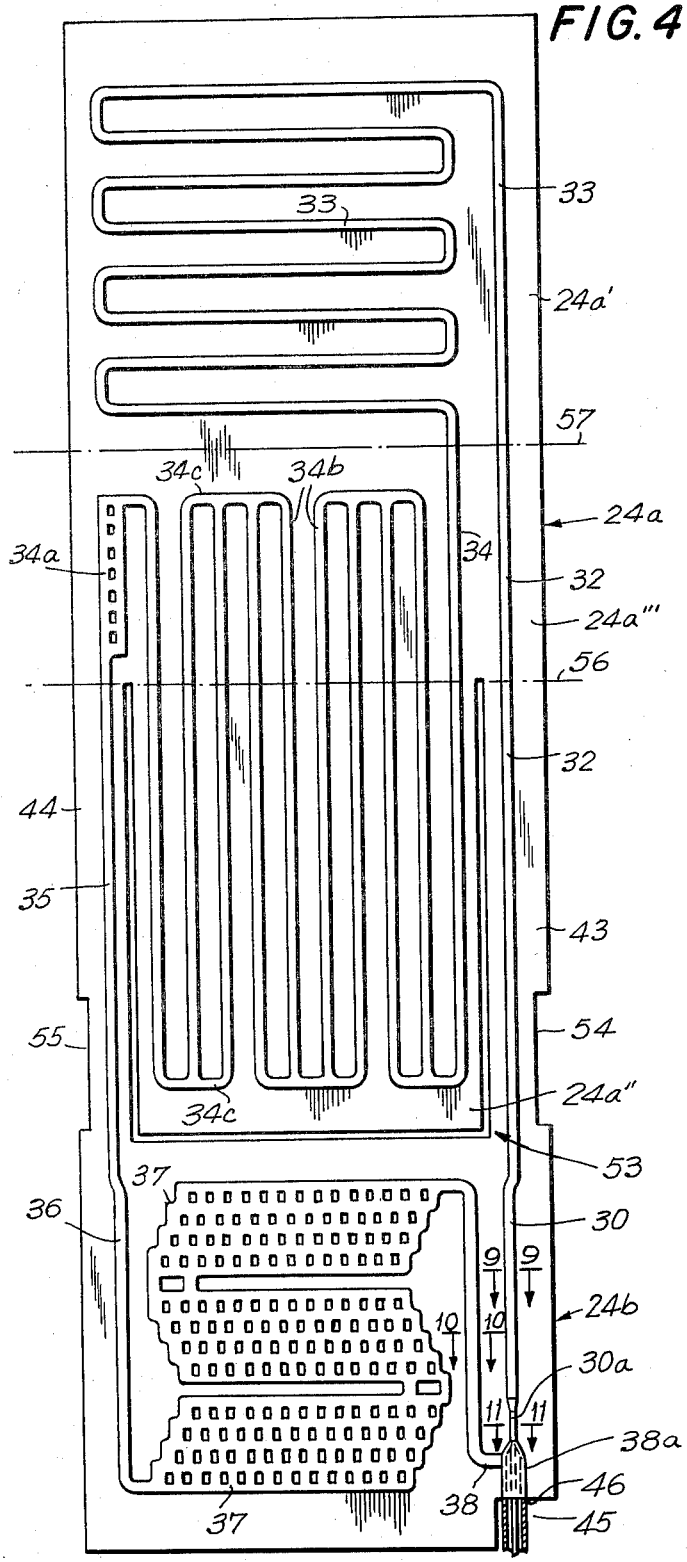
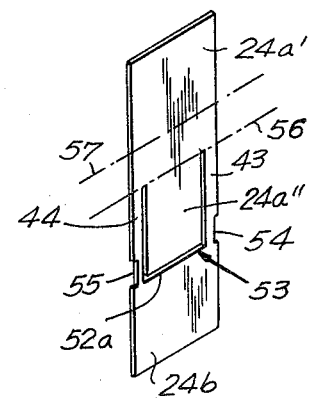
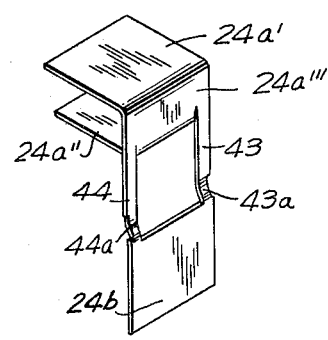
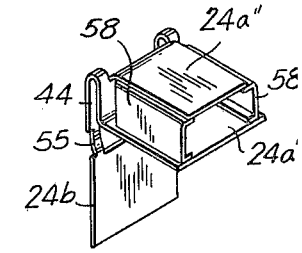

Aug. 2, 1966  A. G. HELLSTROM  3,263,440
REFRIGERATION

Filed Dec. 14, 1964  5 Sheets-Sheet 4

INVENTOR
*Axel Gösta Hellstrom*
BY
*[signature]*
ATTORNEY

Aug. 2, 1966  A. G. HELLSTROM  3,263,440
REFRIGERATION

Filed Dec. 14, 1964  5 Sheets-Sheet 5

INVENTOR
Axel Gösta Hellstrom
BY
his ATTORNEY

United States Patent Office 3,263,440
Patented August 2, 1966

3,263,440
REFRIGERATION
Axel Gosta Hellstrom, Johanneshov, Sweden, assignor to Aktiebolaget Electrolux, Stockholm, Sweden, a corporation of Sweden
Filed Dec. 14, 1964, Ser. No. 417,937
20 Claims. (Cl. 62—288)

My invention relates to refrigeration, and more particularly to cooling of the thermally insulated interior of a household refrigerator.

It is an object of my invention to provide an improvement for cooling thermally segregated compartments of a household refrigerator cabinet with a cooling unit or evaporator structure of a compression refrigerating system formed from a pair of contacting metal sheets having passage means formed therebetween.

Another object of my invention is to provide an improved cooling unit of this kind in which the contacting metal sheets include a first cooling unit section of C-shape having parallel sides and a closed end forming the top, bottom and rear walls of a cooling unit section for cooling a first thermally segregated compartment of a cabinet interior, and a second cooling unit section comprising a plate-like member which depends downward from the rear wall of the first cooling unit section for cooling a second thermally segregated compartment of the cabinet interior, the second plate-like member being disposed in a vertical plane closely adjacent to the vertical plane of the rear wall of the first cooling unit section.

A further object of the invention is to provide a cooling unit of this kind in which the first and second cooling unit sections are effectively employed to maintain the thermally segregated spaces at temperatures respectively below and above the freezing temperature of water by elongated connecting strips which provide poor heat conductive paths and are formed integrally with the contacting metal sheets and vertically overlap at least a major portion of the overall height of the rear wall of the first cooling unit section.

A still further object of the invention is to provide an improvement for cooling the thermally insulated interior of a refrigerator cabinet with a cooling unit of this kind which, together with an insulated partition defining the thermally insulated compartments of the cabinet interior, are insertable into the cabinet through the open front thereof.

The novel features which I believe to be characteristic of my invention are set forth with particularity in the claims. The invention itself, however, both as to organization and method, together with the objects and advantages thereof, will be better understood by reference to the following description taken in connection with the accompanying drawings, in which:

FIG. 4 is a plan view of metal sheeting with fluid passage means therebetween from which parts shown in FIGS. 1 to 3 are formed;

FIGS. 5, 6 and 7 are perspective views schematically illustrating the steps in forming parts shown in FIGS. 1 to 3 from the metal sheeting illustrated in FIG. 4;

Figure 1:
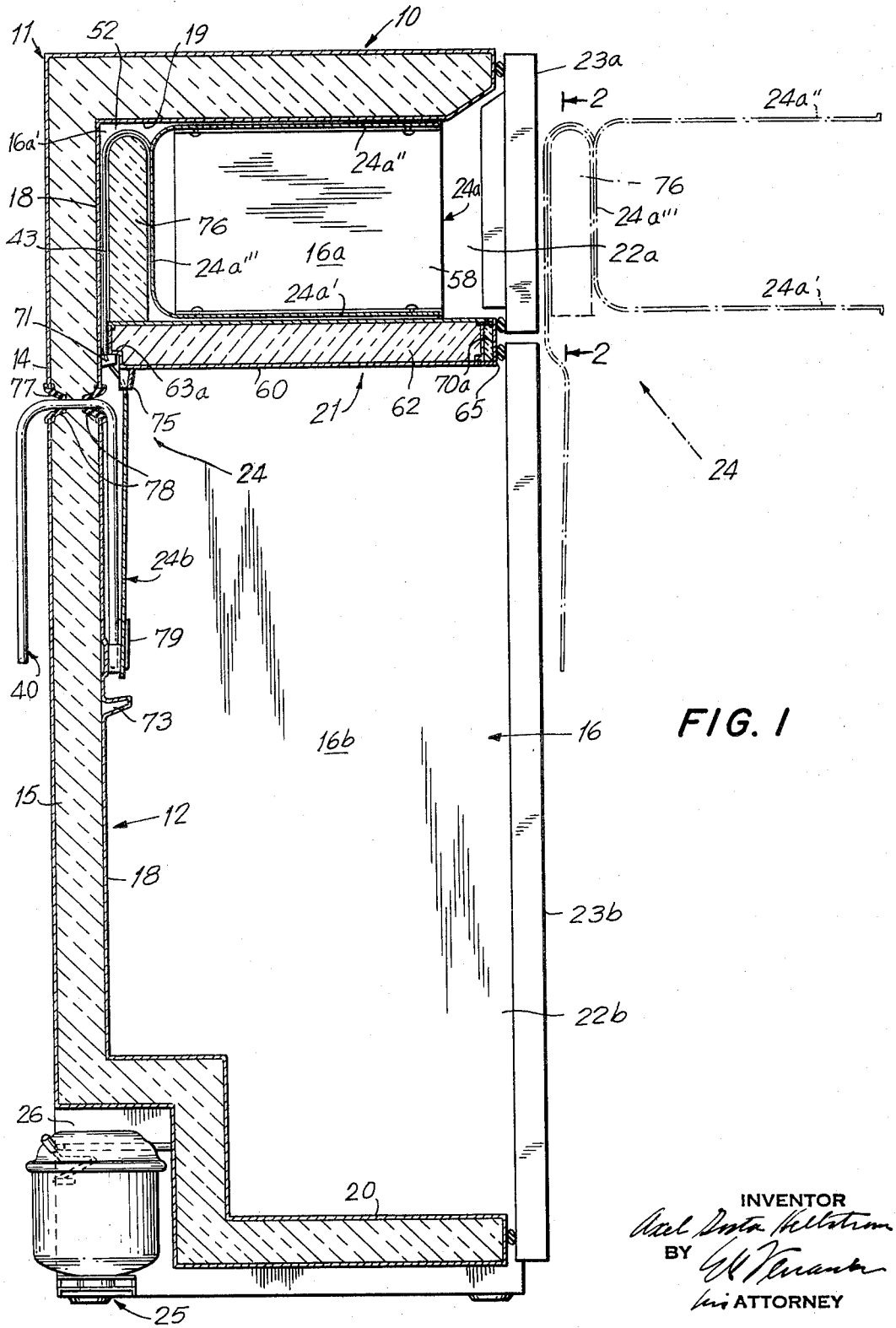
FIG. 1 is a side vertical section of a refrigerator embodying the invention.
Figure 2:
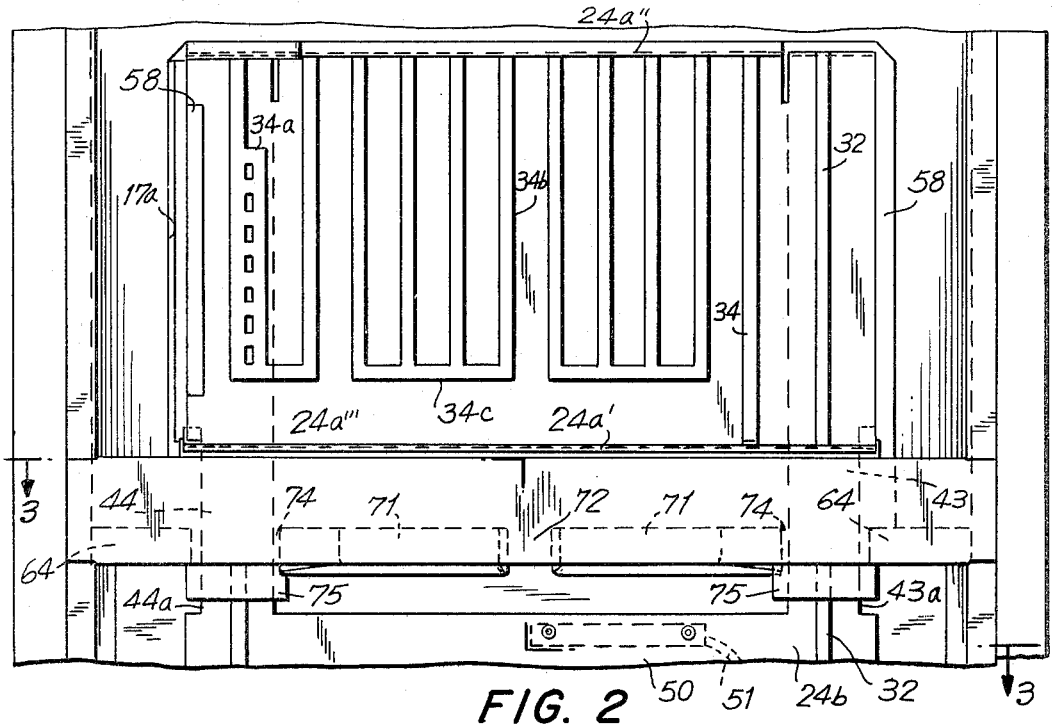
FIG. 2 is a fragmentary front view of the refrigerator taken at line 2—2 of FIG. 1.
Figure 3:
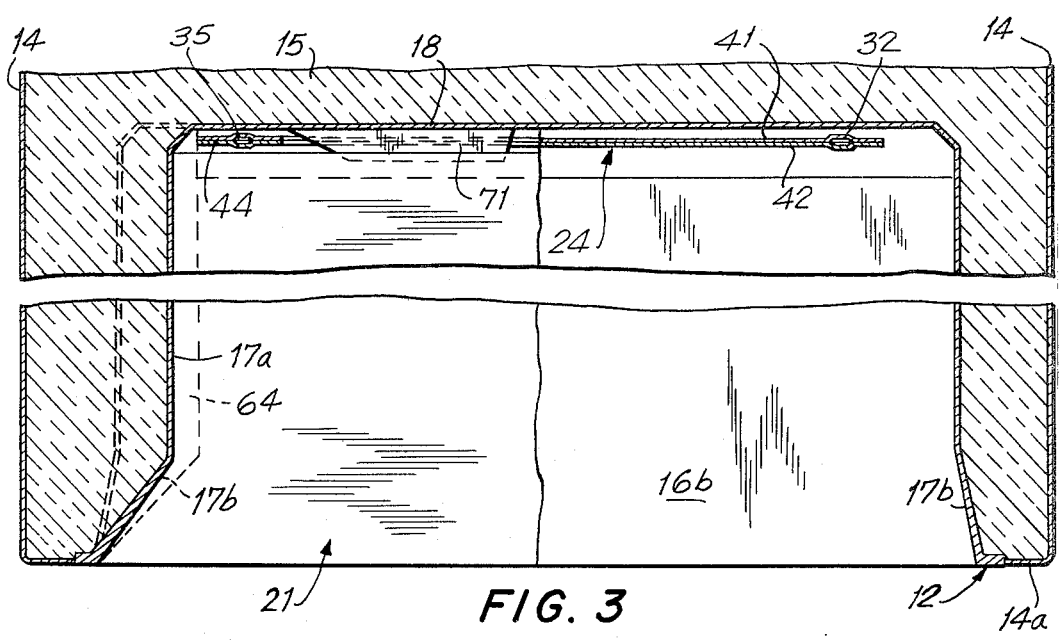
FIG. 3 is a horizontal sectional view, partly broken away, taken at line 3—3 of FIG. 2.
Figure 8:
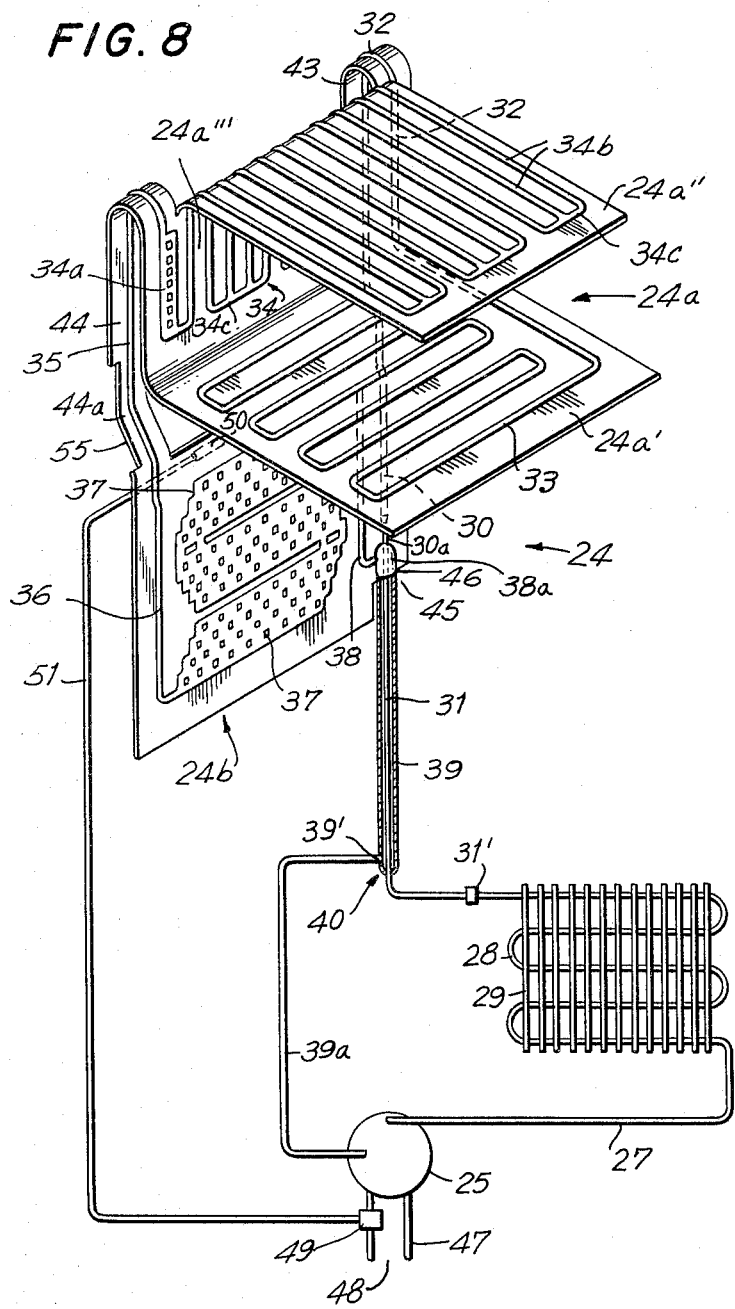
Figure 9:
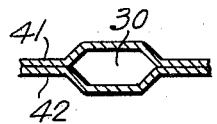
Figure 10:
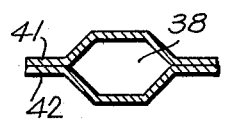
Figure 11:
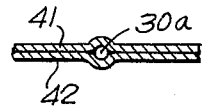
Figure 12:
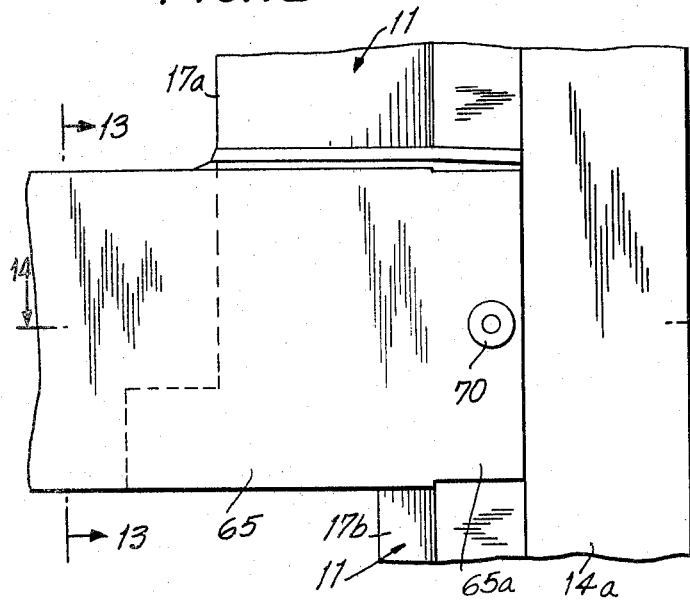
Figure 13:
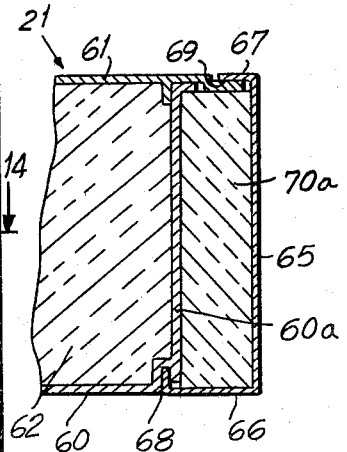
Figure 14:
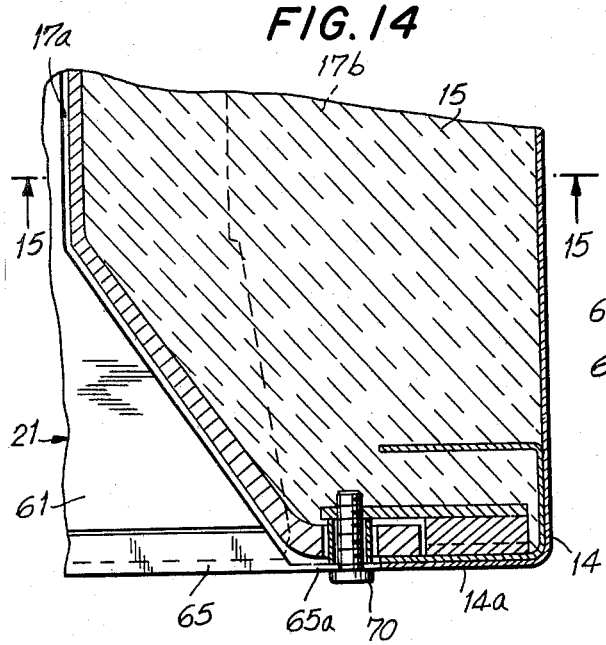
Figure 15:
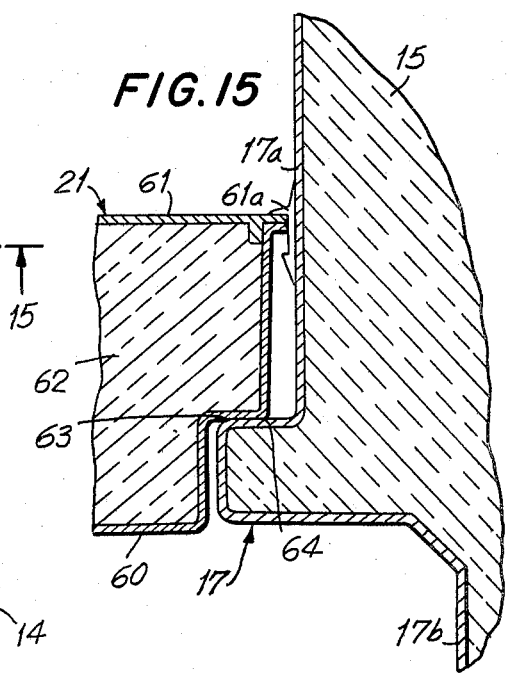

FIG. 8 diagrammatically illustrates a refrigeration system including a perspective view of parts of the refrigerator shown in FIGS. 1 to 3 and schematically illustrated in FIG. 7;

FIGS. 9, 10 and 11 are fragmentary sectional views taken at lines 9—9, 10—10 and 11—11, respectively, of FIG. 4;

FIG. 12 is an enlarged fragmentary view of parts shown in FIG. 2;

FIGS. 13 and 14 are sectional views taken at lines 13—13 and 14—14, respectively, of FIG. 12; and FIG. 15 is a sectional view taken at line 15—15 of FIG. 14.

Referring to FIG. 1, I have shown my invention embodied in a household refrigerator 10 comprising a cabinet 11 having an inner liner or shell 12 arranged within an outer shell 14 and insulated therefrom with any suitable insulating material 15. The inner shell 12 defines the thermally insulated interior 16 of the cabinet 10 which is divided by a horizontal partition 21 into top and bottom spaces 16a′ and 16b, respectively. The top space 16a′ includes a thermally insulated freezer compartment 16a, and the bottom space 16b serves as a food compartment for storing foods at a higher temperature than in the compartment 16a and preferably at a temperature above 32° F. Access to the compartments 16a′ and 16b is afforded at front openings 22a and 22b which are adapted to be closed by insulated doors 23a and 23b hinged in any suitable manner (not shown) at the front of the cabinet 11.

A cooling unit or evaporator structure 24 of a compression refrigerating system is disposed within the space 16. The cooling unit 24 includes a low temperature cooling unit section 24a disposed within the top space 16a′ and a higher temperature cooling unit section 24b disposed within the bottom space 16b. As shown in FIG. 8, the cooling unit 24 forms part of a compression refrigerating system which includes a motor-compressor unit 25 comprising a casing within which a motor and compressor are disposed. The motor-compressor unit 25 desirably is located in a space 26 at the rear of the cabinet 11 exteriorly of the thermally insulated space 16, as shown in FIG. 1. In FIG. 8 compressed refrigerant gas discharged from the motor-compressor unit 25 flows through a connection 27 to a condenser 28 in the form of a looped coil having a plurality of heat dissipating elements 29 fixed thereto for cooling the refrigerant by air circulating in thermal exchange relation therewith at the rear of the cabinet 11.

The refrigerant is condensed in the condenser 28 and flows therefrom to passage means 30 of the cooling unit 24 under the control of a small diameter flow-restricting or capillary tube 31. As best shown in FIG. 4, refrigerant flows from passage means 30 through passage means 32 to passage means 33 and 34 and an accumulator section 34a in the low temperature cooling unit section 24a. From the accumulator section 34a in the low temperature cooling unit section 24a refrigerant flows through passage means 35 and 36 to an accumulator 37 in the higher temperature cooling unit section 24b. Vaporized refrigerant flows from accumulator section 34a through passage means 35 and 36 to the accumulator 37, and this vapor, together with vapor formed in the accumulator 37, is withdrawn from passage means 38 by the motor-compressor unit 25 through a suction line 39, as shown in FIG. 8. The suction line 39 is in thermal exchange relation along its length with the flow-restricting tube 31 and forms a heat exchanger 40, the tube 31 extending lengthwise of and within the suction line.

The cooling unit 24 is fabricated of sheet metal and comprises sheets of metal 41 and 42 which are united and held together in intimate physical contact with one another and formed with embossings. The embossings form a path of flow for the refrigerant which includes the passage means 30, 32, 33, 34, accumulator section 34a, passage means 35 and 36, the accumulator 37, and the passage means 38. The sheets 41 and 42 may be united together in any well-known manner, such as by roll-forging or roll-bonding, for example, and are shaped in a manner to be described presently, whereby the low and higher temperature cooling unit sections 24a and 24b are integrally connected to one another by relatively narrow strips or connecting bridges 43 and 44 in which the passage means 32 and 35 are formed, as best shown in FIG. 8.

The higher temperature cooling unit section 24b is notched at 45 at a bottom corner thereof, as shown in FIGS. 4 and 8. The passage means 30 extends vertically upward from the notch 45 and includes a narrow constricted lower end portion 30a. The lower end of the passage means 38 is L-shaped and includes a first part or an upright arm 38a which extends vertically upward at 46 from the bottom edge of the cooling section 24b, at the region of the notch 45, and merges with the narrow lower end portion 30a of the passage means 30. When the heat exchanger 40 is connected to the cooling unit section 24b, the extreme end of the capillary tube 31 forming the inner passage thereof is inserted into the lower end of the constricted portion 30a of the passage means 30, and the extreme end of the suction line 39 forming the outer passage thereof is positioned at 46 against the lower end of the upright arm 38a of the lower L-shaped end of the passage means 38. With the capillary tube 31 and suction line 39 in the positions just described, they are simultaneously joined to the sheets 41 and 42 at the regions thereof defining the constricted portion 30a and upright arm 38a, respectively, as by welding, for example.

The refrigerant passing through the flow-restricting tube 31 flows therefrom through the constricted portion 30a and thence upward through passage means 30 and through the other passage means and accumulators in the cooling unit 24 in a manner to be described presently. Refrigerant vapor is withdrawn from the accumulator 37 into the suction line 39 through the passage means 38 including the upright arm 38a thereof. The manner in which the flow-restricting tube 31 and suction line 39 are respectively connected to the passage means 30 and 38 of the higher temperature cooling section 24b is fully described and claimed in my copending application Serial No. 327,913, filed December 4, 1963, now Patent No. 3,188,831, granted June 15, 1965.

In conductors 47 for supplying electrical energy from a source of supply 48 to the motor-compressor unit 25 is connected a switch 49, as shown in FIG. 8, which is thermostatically controlled in any suitable manner responsive to a temperature condition affected by the higher temperature cooling section 24b. Such a thermostatic control may include a thermal bulb 50 heat conductively connected to the rear face of the higher temperature cooling unit section 24b and a capillary tube 51 connected thereto which are charged with a suitable volatile fluid and arranged to close and open the switch 49 responsive to rise and fall, respectively, of the higher temperature cooling unit section 24b.

In accordance with my invention, the metal sheets 41 and 42 are bent in such manner that one portion thereof is three-sided and of C-shape having parallel sides 24a' and 24a'' and a closed end 24a''' which respectively define the bottom, top and rear walls of the low temperature cooling unit section 24a, and another portion thereof is plate-like in character and defines the higher temperature cooling unit section 24b which depends downward from the rear wall 24a''' of the low temperature cooling unit section 24a in a vertical plane closely adjacent to the vertical plane of the rear wall 24a'''.

The low and higher temperature cooling unit sections 24a and 24b are integrally connected to one another by the relatively narrow connecting strips or connecting bridges 43 and 44 in which the passage means 32 and 35, respectively, are formed. As best shown in FIGS. 1 and 8, the connecting strips 43 and 44 extend downward from the top wall 24a'' of the low temperature cooling unit section 24a. The connecting strips 43 and 44 are disposed at the rear of the rear wall 24a''' of the cooling unit section 24a and removed therefrom and occupy a space 52 between the rear wall 18 of the inner liner 12 and the rear wall 24a''' of the cooling unit section 24a, as shown in FIG. 1. The lower ends 43a and 44a of the connecting strips, which extend downward from the bottom wall 24a' of the cooling unit section 24a, slope forward toward the front of the cabinet 11, as shown in FIG. 8. The higher temperature cooling unit section 24b depends downward from the lower ends 43a and 44a of the connecting strips 43 and 44.

During operation of the refrigerating system, the refrigerant passing into passage means 30 from the flow-restricting tube 31 flows upward therefrom through one part of passage means 32 in the connecting bridge 43 and then downward through another part of the passage means 32 in the rear wall 24a''' of the cooling unit section 24a into passage means 33. The passage means 33 in the bottom wall 24a' of the cooling unit section 24a forms a continuous zig-zag path of flow for refrigerant from the front to the rear of the bottom wall 24a'.

Refrigerant passes from the passage means 33 to passage means 34. As shown in FIGS. 4 and 8, the passage means 34 includes longitudinal portions 34b, the opposite ends of which terminate at the lower part of the rear wall 24a''' and forward part of the top wall 24a'' of the cooling unit section 24a, respectively. The longitudinal portions 34b are connected by end portions 34c to form a continuous zig-zag path of flow for refrigerant transversely of the top and rear walls 24a'' and 24a''', respectively, from the connecting strip 43 to the connecting strip 44, as best shown in FIG. 8. It will be seen that some of the longitudinal portions 34b are connected in parallel between the connecting end portions 34c.

Unevaporated refrigerant passes from the passage means 34 to the accumulator section 34a formed in the rear wall 24a''' of the cooling unit section 24a. This refrigerant, together with refrigerant vapor passing into the accumulator section 34a from the passage means 34, flows through passage means 35 in the connecting strip 44 and passage means 36 in the cooling unit section 24b to the lower end of the accumulator 37 formed in the latter. Refrigerant vapor passing into the accumulator 37 from the accumulator section 34a, together with refrigerant evaporated in the accumulator 37, is withdrawn therefrom into the suction line 39 of the heat exchanger 40 through the passage means 38.

FIGS. 5, 6 and 7 schematically illustrate the steps in forming the cooling unit 24 illustrated in FIG. 8 from the contacting metal sheets 41 and 42 shown in FIG. 4. As shown in FIGS. 4 and 5, the contacting metal sheets 41 and 42 are formed with a U-shaped slit 53 and notches 54 and 55. To form the cooling unit sections 24a and 24b, the portion 24a'' of the metal sheets 41 and 42 bounded by the U-shaped slit 53 is bent along a dotted line 56 to form a wall perpendicular to the strips 43 and 44, the latter being disposed at the lateral sides of the sheets 41 and 42 outside the parallel arms of the U-shaped slit 53. The top sheet portion 24a' also is bent at a dotted line 57 to form a wall parallel to the sheet portion 24a'', as shown in FIG. 6. The lower bent or inclined portions 43a and 44a of the connecting strips 43 and 44, at the regions of the notches 54 and 55 of the sheets, may be formed at the same time or after the sheet portions 24a'' and 24a' are bent to provide the relationship of sheet parts shown in FIG. 6.

The sheet parts 24a', 24a'' and 24a''' in FIG. 6 are then bent through an angle of 180° about the upper ends of the connecting strips 43 and 44 to provide the relationship of parts shown in FIG. 7. It will now be evident that sheet parts 24', 24a'' and 24a''' now form the bottom, top and rear walls, respectively, of the cooling unit section 24a, as illustrated in FIGS. 1 and 8. As shown in FIG. 7, the top and bottom walls 24a'' and 24a' desirably are connected in any suitable manner by metal side walls 58 to provide the freezer compartment 16a which is open only at the front opening 22a.

In further accord with the invention, both the cooling unit 24 of the refrigerating system and the horizontal partition 21 are insertable into the cabinet interior 16 through the open front of the cabinet 11. As best shown in FIGS. 13 and 15, the partition 21 comprises a relatively deep bottom or pan 60 and a cover 61 therefor which desirably are formed of plastic and within which a body 62 of insulating material is retained. The lateral sides of the pan 60 are formed with outwardly extending ledges 63 which are supported by guideways 64 formed at the lateral side walls 17 of the inner liner 12. In order to provide extra insulation for the freezer compartment 16a, the parts 17a of the lateral side walls 17 of the inner liner 12 above the guideways 64 are spaced a greater distance from the outer shell 14 than the parts 17b of the lateral side walls below the guideways 64. This will be evident from FIG. 3 in which the left side is a horizontal sectional view taken above the partition 21 and the right side is a horizontal sectional view below the partition 21.

The outer shell 14 is formed with front marginal portions 14a to which the forward edges of the inner liner 12 are fixed in any suitable manner. The cabinet 11 is provided with a front horizontal trim strip 65 which is disposed between the insulated doors 23a and 23b, as illustrated in FIG. 1. As best shown in FIG. 13, the trim strip 65, which may be formed of sheet metal like aluminum, for example, is formed with flanges 66 and 67 which function to removably interlock the trim strip at 68 and 69 with pan 60 and cover 61, respectively, of the partition 21. The trim strip 65 and front side wall 60a of the pan 60 define a space across the front of the partition 21 in which a body 70a of insulation is retained. As shown in FIGS. 12 and 14, the trim strip 65 is provided with end portions 65a which are flush with and abut the marginal front portions 14a of the outer shell 14 and removably secured thereto at 70, as by screws, for example.

It will now be understood that the partition 21 is insertable into the cabinet interior 16 through the open front of the cabinet 11 and supported by the guideways 64 at the lateral side walls 17 which function at tracks upon which the partition can be moved rearward in the cabinet interior 16. When the partition 21 is properly positioned in the liner 12, the front trim strip 65 is removably secured at 70 to the front marginal portions 14a of the outer shell 14.

In addition to the guideways 64 at the lateral side walls 17, the rear wall 18 of the liner 12 is provided with a pair of support members 71 having a gap 72 therebetween, as shown in FIG. 2. A passageway (not shown) is provided at the rear of the partition 21, at the region of the gap 72, to enable water to drain from the cover 61 of the partition 21 over the inner surface of the rear wall 18 of the inner liner 12 to a trough 73 from which the collected water may be conducted to waste in any suitable manner. The rear side wall of the pan 60 of the partition 21 desirably is formed with short ledges 73, each of which is like the lateral side ledges 63 and adapted to rest on one of the support members 71, as shown in FIG. 1.

Gaps 74 are formed between the short rear ledges 73 and the guideways 64 at the lateral side walls 17 of the liner 12, as shown in FIG. 2. The connecting strips 43 and 44 integrally connecting the cooling unit sections 24a and 24b pass through the gaps 74. Suitable decorative collars 75 of semicircular form may be provided at the bottom of the pan 60 of the partition 21 to conceal from view the lower inclined ends 43a and 44a of the connecting strips 43 and 44, as seen in FIGS. 1 and 2.

When the partition 21 and cooling unit 24 are inserted into position at the front opening of the cabinet 11, a block 76 of insulating material, such as polyurethane foam, for example, is inserted between the rear face of the rear wall 24a''' of the low temperature cooling unit section 24a and the connecting strips 43 and 44, as indicated in the dotted line position of the cooling unit 24 in FIG. 1. When the cooling unit 24 is inserted in the inner liner 12 from its dotted line position into its solid line position shown in FIG. 1, it will be seen that the insulating block 76 will occupy the rear portion 52 of the top space 16a' at the rear of the low temperature cooling unit section 24a. The partition 21 then is moved rearward in the lateral guideways 64 until the short ledges 63a at the rear wall of the partition firmly rest on the liner support members 71, as seen in FIG. 1. As shown in FIG. 15, the lateral side walls 17a are provided with members 61a which function to conceal the slot between cover 61 and side walls 17a.

The heat exchanger 40 of the refrigerating system is arranged to pass through an opening 77 which is formed in the rear insulated wall of the cabinet 11. The heat exchanger 40 will be concealed from view by the higher temperature cooling unit section 24b and only its lower end, at the region it is connected to the cooling unit section 24b at the notch 45 formed therein, will be visible from the front of the cabinet. The rear wall of the cabinet 11 desirably is provided with rubber grommets 78 or the like at the opening 77 therein to provide an airtight seal at the only opening formed in the cabinet 11 to connect the cooling unit 24 to other parts of the refrigerating system.

The heat exchanger 40 desirably is connected to the lower end of the cooling unit section 24b before the cooling unit 24 is inserted into the cabinet interior 16 through the front opening of the cabinet 11. At the time the cooling unit 24 is inserted into the cabinet interior 16, the end of the heat exchanger 40 remote from its connection to the cooling unit section 24b is inserted through the opening 77 in the rear wall of the cabinet 11 and the rubber grommets 78 are fixed in place at the opening 77. Subsequently, the capillary tube 31 is connected at 31' to the outlet end of the condenser 28 and the section 39a of the suction line 39 is connected at 39' to the outer pipe of the heat exchanger 40, as shown in FIG. 8.

After the cooling unit section 24b is positioned in the compartment 16b, it may be detachably connected at 79 at its opposite edges to the rear wall 18 of the inner liner. In this way the lower cooling unit section 24b will be properly positioned for water to drain therefrom into the collection trough 73 during defrosting.

To move the cooling unit 24 forward within the interior 16 of the cabinet 11, the bottom cooling section 24b may be detached from the rear wall 18 of the liner 12 at 79. The screws 70 are then removed to disconnect the trim strip 65 from the front marginal portions 14a of the cabinet 11 and permit the horizontal trim strip 65 to be detached from the front of the partition 21. When the foregoing is accomplished, the partition 21, cooling unit 24 and insulating block 76 can be moved forward within the cabinet interior 16. This facilitates cleaning of the cabinet interior 16 whenever it is necessary. Further, by inserting the cooling unit 24 into the cabinet interior 16 through the open front of the cabinet 11, it is not necessary to provide an opening in the rear of the cabinet to insert the cooling unit therein. As seen in FIG. 1, the only opening required in the cabinet walls is that provided for the heat exchanger 40 which passes through the opening 77. The small opening 77 can be easily made airtight by rubber grommets 78 or the like to protect the insulation 15 from moisture.

The relationship of parts or components of the cooling unit 24 are such that they can be formed from the metal sheets 41 and 42 without any substantial loss of sheet material and after forming the single U-shaped slit 53 and small notches 45, 54 and 55, the notch 45 being formed to facilitate the connection of the heat exchanger 40 to the cooling unit section 24b and the notches 54 and 55 defining the lower end portions 43a and 44a of the connecting strips 43 and 44 which pass through the gaps 74 at the rear of the partition 21.

By providing the connecting strips 43 and 44 at the opposing lateral sides of the metal sheets 41 and 42, a relationship of parts is provided which is stable and rigid and facilitates handling of the flat metal sheets 41 and 42 in all stages of fabricating the cooling unit 24 therefrom.

By bending the low temperature cooling unit section 24a from the position shown in FIG. 6 to that shown in FIGS. 7 and 8 during its fabrication, it is possible to employ integrally formed connecting strips 43 and 44 between the low and higher temperature cooling unit sections 24a and 24b which are exceptionally long and effectively function to provide a relatively poor heat conductive path therebetween. With this arrangement it is possibly to defrost the higher temperature cooling unit section 24b without materially affecting the temperature of the low temperature cooling unit section 24a during the defrosting period. As best shown in FIGS. 1 and 8, the integrally formed connecting strips 43 and 44 are vertically coextensive with the low temperature cooling unit section 24a through at least a major portion of its overall height. This is effected by bending the low temperature cooling unit section 24a back upon itself from the position shown in FIG. 6 to the position shown in FIGS. 7 and 8 during its fabrication so that the connecting strips 43 and 44 vertically overlap the rear wall 24a''' of the cooling unit section 24a and also extend vertically downward into the food storage space 16b through a vertical distance corresponding to the thickness of the horizontal partition 21. With this construction the connecting strips 43 and 44 and rear wall 24a''' of the cooling unit section 24a are of inverted U-shape with the closed ends thereof essentially at the same level as the top wall 24a'' of the cooling unit section 24a.

During operation of the refrigerating system, the low and higher temperature cooling unit sections 24a and 24b function to abstract heat from the frozen food section 16a and food storage space 16b, respectively. The portions of the cooling unit 24 having refrigerant passage means in open communication with one another will operate at substantially the same temperature range. When the metal sheets 41 and 42 are employed to provide both the low and higher temperature cooling unit sections 24a and 24b which are integrally connected to one another by the relatively narrow strips or connecting bridges 43 and 44, it is possible nevertheless to maintain a substantial temperature differential between the frozen food section or freezer compartment 16a and higher temperature food storage space 16b by correctly proportioning the length of the path of flow of the refrigerant in the respective low and higher temperature cooling unit sections and the relative sizes of the sheet metal parts associated with the cooling sections. When the refrigerating system is functioning to maintain the freezer compartment 16a at a very low temperature in a range of about −18° to −25° C., for example, the higher temperature cooling unit section 24b will be functioning to maintain the storage space 16b at a temperature above freezing. Under these operating conditions, frost will tend to form on the higher temperature cooling unit section 24b.

When the desired temperature has been attained in the storage space 16b, the thermostatic control will function to open switch 49 and disconnect the motor-compressor unit 25 from the source of electrical supply 48. The thermal bulb 50 is heat conductively connected to the higher temperature cooling unit section 24b at such a zone that, after the switch 49 is opened, the thermostatic control will not function to close switch 49 and connect the motor-compressor unit 25 to the source of electrical supply again until the higher temperature cooling unit section 24b is completely defrosted. By way of example, the thermostatic control may be of a type which can be arranged to always close the switch 49 substantially at the same temperature, which may be about +1 or +2° C., for example, when the higher temperature cooling section 24b is completely defrosted.

Since the freezer compartment 16a is effectively insulated by the insulation 15, 62 and 76 and the relatively narrow strips or connecting bridges 43 and 44 between the low and higher temperature cooling unit sections 24a and 24b provides a relatively poor heat conductive path therebetween, the temperature of the freezer compartment 16a tends to remain at a substantially constant low temperature during the periods when the switch 49 is open and the motor-compressor unit 25 is disconnected from the source of electrical supply 48.

Modifications of my invention which has been described will occur to those skilled in the art. Therefore, as I desire my invention not to be limited to the particular arrangement set forth, I intend in the claims to cover all those modifications which do not depart from the spirit and scope of the invention.

I claim:

1. A refrigerator comprising a cabinet having a thermally insulated interior divided into first and second thermally segregated spaces, a compression refrigerating system including a cooling unit disposed in the cabinet interior which is formed from contacting metal sheets having passage means therebetween, said metal sheets including a first part forming the top, bottom and rear walls of a first low temperature cooling unit section and a plate-like second part which is adjacent to said first part and depends therefrom and forms a second higher temperature cooling unit section and a third part comprising relatively narrow strip means providing a relatively poor heat conductive path and connecting said first and second parts, said passage means between said contacting metal sheets providing a path of flow for refrigerant having portions in said first and second cooling unit sections and said connecting strip means and in which refrigerant flows serially therethrough, structure including said first low temperature cooling unit section providing a freezer compartment in said first space and from which said first cooling unit section is arranged to abstract heat, and structure comprising said second higher temperature cooling unit section for abstracting heat from said second space, said connecting strip means vertically overlapping at least a major portion of the rear wall of said first part of said first low temperature cooling unit section.

2. A refrigerator as set forth in claim 1 in which the thermally insulated interior of the cabinet is divided into said first and second thermally segregated spaces by a horizontal thermally insulated partition, the first and second spaces respectively being above and below said partition, said relatively narrow strip means of said third part extending vertically downward from said first low temperature cooling unit section past said partition to said second higher temperature cooling unit section, and said relatively narrow connecting strip means further extending downward from said first part at the vicinity of the top wall of said first cooling unit section and forming an inverted U-shape with said rear wall of said first part.

3. A refrigerator as set forth in claim 1 in which the thermally insulated interior of the cabinet is divided into said first and second thermally segregated spaces by a horizontal thermally insulated partition, the rear of said partition and the rear wall of the interior of the cabinet being formed to provide vertically extending passageways therebetween, the first and second spaces respectively being above and below said partition, said connecting strip means comprising a pair of relatively narrow strips extending vertically downward from the lateral sides of said first low temperature cooling unit through said passageways to the lateral sides of said plate-like member of said second higher temperature cooling unit, and each of said connecting strips vertically overlapping at least a major portion of the rear wall of said first part of said low temperature cooling unit section.

4. A refrigerator as set forth in claim 3 in which said narrow strips extend downward from said first part at the vicinity of the top wall of said first cooling unit section and form inverted U-shapes with said rear wall of said first part.

5. A refrigerator as set forth in claim 4 in which said top and bottom walls of said first part of said first cooling unit section are respectively disposed at the ceiling of said first space and at the top surface of said partition and the rear wall of said first part is removed from the rear wall of the interior of said cabinet and said narrow strips are adjacent to the last-mentioned rear wall, and a body of insulating material retained in said first space between the rear wall of said first part and said narrow strips.

6. A refrigerator comprising a cabinet having thermally insulated walls defining a thermally insulated space provided with an open front, said space being divided into top and bottom compartments by a horizontal thermally insulated partition, door structure for closing the open front of the cabinet, a compression refrigerating system including a cooling unit disposed in said space which is formed from contacting metal sheets having passage means therebetween, said metal sheets including a first part forming the top, bottom and rear walls of a low temperature cooling unit section and a plate-like second part which is adjacent to said first part and depends therefrom and forms a higher temperature cooling unit section and a third part comprising relatively narrow strip means which connects said first and second parts and provides a relatively poor heat conductive path therebetween, said passage means between said contacting metal sheets providing a path of flow for refrigerant having portions in said low and higher temperature cooling unit sections and said connecting strip means and in which refrigerant flows serially therethrough, structure including said low temperature cooling unit section providing a freezer shell in said top compartment and from which said low temperature cooling unit section is arranged to abstract heat, and structure comprising said higher temperature cooling unit section for abstracting heat from said bottom compartment, said connecting strip means vertically overlapping at least a major portion of the rear wall of said first part forming said low temperature cooling unit section, said cooling unit and thermally insulated partition being insertable into said space through the open front of the cabinet.

7 A refrigerator as set forth in claim 6 in which the thermally insulated walls include an inner liner which defines the thermally insulated space, said thermally insulated walls including lateral side walls, means on said lateral side walls for removably supporting said partition, said cabinet including marginal front portions and a horizontal trim strip extending between the marginal front portions across the opening, means for removably securing said trim strip to the front of said partition, and means for detachably connecting the ends of said trim strip to the marginal front portions of the cabinet 8 A refrigerator comprising a cabinet having thermally insulated walls including an inner liner which defines a thermally insulated space provided with an open front and door structure for closing the open front of the cabinet, a thermally insulated partition for dividing the space into top and bottom compartments, said thermally insulated walls including lateral side walls, means for removably supporting said partition comprising members on said lateral side walls, a compression refrigerating system comprising a plurality of parts including a cooling unit which is disposed in said space and comprises a low temperature cooling unit section in said top compartment and a higher temperature cooling unit section in said bottom compartment, structure including said low temperature cooling unit section providing a freezer shell in said top compartment and from which said low temperature cooling unit section is arranged to abstract heat, and structure comprising said higher temperature cooling unit section for abstracting heat from said bottom compartment, said cooling unit and thermally insulated partition being insertable into said space through the open front of the cabinet, and means for connecting said cooling unit to other parts of said refrigerating system.

9. A refrigerator comprising a cabinet having a thermally insulated interior divided into thermally segregated spaces one above another, a compression refrigerating system comprising a cooling unit disposed in the cabinet interior which is formed from a pair of contacting metal sheets having passage means therebetween, said metal sheets including a three-side part of C-shape having parallel sides and a closed end forming the top, bottom and rear walls of a low temperature cooling unit section and a plate-like part adjacent to said C-shaped part forming a higher temperature cooling unit section and relatively narrow strip means providing a poor heat conductive path and integrally connecting said C-shaped part and said plate-like part, said passage means between said sheets providing a path of flow for refrigerant having portions in said C-shaped part and said plate-like part and said connecting means, structure comprising said C-shaped part providing a freezer compartment in said top space for abstracting heat therefrom, and structure in said bottom space comprising said plate-like part for abstracting heat therefrom, said connecting strip means being disposed at the rear of said C-shaped part and vertically overlapping at least a major portion of said rear wall of said low temperature cooling unit section formed by the closed end of said C-shaped part.

10. A refrigerator as set forth in claim 9 in which said connecting strip means comprises a pair of relatively narrow strips which are laterally spaced from one another and extend vertically downward from said C-shaped part at the vicinity of the top wall of said low temperature cooling unit section and form an inverted U-shape with the rear wall of said low temeprature cooling unit section formed by the closed end of said C-shaped part.

11. A refrigerator as set forth in claim 9 in which the cabinet comprises a plurality of insulated walls defining the thermally insulated interior, said walls including a rear wall and lateral side walls, a thermally insulated partition for dividing the cabinet interior into the top and bottom spaces, the thickness of the lateral side walls being greater above said partition than below said partition, and a body of insulating material retained in said top space between the rear wall of said low temperature cooling unit section formed by the closed end of said C-shaped part and the downwardly extending strips.

12. A refrigerator as set forth in claim 11 in which the thermally insulated interior is provided with an opening and door structure for the opening, said cooling unit and said partition being insertable into the cabinet interior through the opening, and means for removably supporting said partition including members at the lateral side walls.

13. A refrigerator as set forth in claim 12 in which the rear wall of said low temperature cooling unit formed by the closed end of said C-shaped part is disposed in a vertical plane parallel to the rear wall of the cabinet and spaced therefrom and said connecting strips are disposed closely adjacent to the rear cabinet wall, whereby said body of insulating material retained in said top space substantially fills that part of the last-mentioned space between the rear cabinet wall and the rear wall of said low temperature cooling unit section formed by said C-shaped part, and said plate-like part being disposed in a vertical plane closely adjacent to the vertical plane of the rear wall of said low temperature cooling unit section.

14. A refrigerator as set forth in claim 13 in which the rear of said partition and the rear wall of said cabinet have passageways therebetween through which the vertically extending connecting strips extend, the lower ends of said strips being connected to the top portion of said plate-like part at a region closely adjacent to the bottom of said partition, the rear wall of said cabinet having a trough arranged to collect water formed in said plate-like part and dripping therefrom.

15. A refrigerator as set forth in claim 14 in which said refrigerating system includes a compressor unit and condenser disposed outside the thermally insulated interior of the cabinet and a capillary tube connecting said condenser and said cooling unit for supplying refrigerant to the cooling unit and a suction line connecting said compressor unit and said cooling unit for withdrawing refrigerant from the latter, an elongated heat exchanger having inner and outer pipes respectively forming parts of said capillary tube and said suction line, an opening in the rear wall of the cabinet through which a portion of said heat exchanger extends, the last-mentioned portion of said heat exchanger being concealed from view by said plate-like part, the path of flow of refrigerant provided by said passage means respectively having an inlet and outlet at said plate-like part, and means for connecting the inner and outer pipes of said heat exchanger respectively to said inlet and outlet.

16. A refrigerator as set forth in claim 13 in which said thermally insulated partition comprises a relatively deep pan and a cover therefor, a body of insulation retained in said pan, and means at the lateral side walls of the cabinet which coact with said cover to hold the latter on said pan when said partition is removably supported on said members at the lateral side walls.

17. A refrigerator as set forth in claim 13 in which said cabinet includes front marginal portions and a horizontal trim strip extending between the front marginal portions across the opening, means for removably securing said trim strip to the front of said partition, and means for detachably connecting the ends of said trim strip to the marginal front portions of the cabinet.

18. The combination with a refrigerator cabinet having a thermally insulated interior divided by a horizontal thermally insulated partition into top and bottom spaces respectively provided with top and bottom front openings and door structure for closing the openings, of a refrigerating system comprising a cooling unit which is formed from a pair of contacting metal sheets having passage means therebetween; said metal sheets including a three-sided C-shaped part having parallel sides and a closed end forming the top, bottom and rear walls of a low temperature cooling unit section disposed in the top space with the outer free ends of the top and bottom walls extending toward the top front opening, a plate-like part which is adjacent to and below said C-shaped part and disposed in said bottom space and forms a higher temperature cooling unit section, and at least two laterally spaced relatively narrow strip parts providing a poor heat conductive path and integrally connecting said C-shaped part and said plate-like part, said passage means between said sheets providing a path of flow for refrigerant having portions in said C-shaped part and said plate-like part and said connecting strip parts; said connecting strips extending vertically downward in said top space in a zone spaced from the closed end of said C-shaped part past said partition into said bottom space, the lower ends of said connecting strips being connected to the top portion of said plate-like part which is vertically disposed in said bottom space; and the upper ends of said strips extending forward from said zone in said top space and being connected to spaced regions at the lateral sides of the closed end of said C-shaped part at the extreme top portion thereof, the side of the C-shaped part forming the top wall of said low temperature cooling unit extending forward between said spaced regions to which the upper ends of said strips are connected and being narrower than the closed end of the C-shaped part forming the rear wall of said low temperature cooling unit section.

19. The combination set forth in claim 18 in which the side of the C-shaped part forming the bottom of said low temperature cooling unit and the closed end of the C-shaped part have substantially the same width, and vertically disposed metal members having good heat conductivity connecting the parallel sides of the C-shaped part, said last-mentioned metal members forming the side walls of said low temperature cooling unit section.

20. The combination set forth in claim 18 in which said partition and said cooling unit are insertable into the interior of the cabinet through the open front thereof, and means for removably supporting said partition in the interior of the cabinet.

References Cited by the Examiner
UNITED STATES PATENTS

| | | | |
|---|---|---|---|
| 2,310,875 | 2/1943 | Siedle | 62—442 X |
| 2,317,082 | 4/1943 | Philipp | 62—442 X |
| 2,509,011 | 5/1950 | Moore | 62—298 X |
| 2,672,028 | 3/1954 | Wurtz | 62—298 |

ROBERT A. O'LEARY, *Primary Examiner.*

LLOYD L. KING, *Assistant Examiner.*